United States Patent
Tsumura et al.

[19]

[11] Patent Number: 6,036,209
[45] Date of Patent: *Mar. 14, 2000

[54] SYSTEM FOR MANAGING SAFE MOBILE RUN BY SCANNING LANE

[75] Inventors: Toshihiro Tsumura; Kenji Tenmoku; Osamu Shimizu, all of Osaka, Japan

[73] Assignee: Toshihiro Tsumura, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/787,482

[22] Filed: Jan. 22, 1997

[30] Foreign Application Priority Data

Jan. 22, 1996 [JP] Japan ................................. 8-008480

[51] Int. Cl.⁷ .................................................. B60T 7/16
[52] U.S. Cl. ........................... 280/167; 280/168; 280/169
[58] Field of Search .................................... 180/167, 168, 180/169; 701/26, 28, 41, 70

[56] References Cited

U.S. PATENT DOCUMENTS

| | | | |
|---|---|---|---|
| 4,049,961 | 9/1977 | Marcy | 180/79.1 |
| 4,488,233 | 12/1984 | Tsumura | 180/167 |
| 4,491,923 | 1/1985 | Look | 364/478 |
| 4,706,773 | 11/1987 | Reinaud | 180/169 |
| 5,068,654 | 11/1991 | Husher | 180/167 |
| 5,339,241 | 8/1994 | Fujimori et al. | 180/167 |
| 5,369,591 | 11/1994 | Broxmeyer | 364/461 |
| 5,428,439 | 6/1995 | Parker et al. | 180/169 |
| 5,521,579 | 5/1996 | Bernhard | 180/167 |
| 5,675,518 | 10/1997 | Kuroda et al. | 180/168 |

*Primary Examiner*—J. J. Swann
*Assistant Examiner*—James S. McClellan
*Attorney, Agent, or Firm*—McDermott, Will & Emery

[57] ABSTRACT

A mobile run management system includes a detector provided along a course for movement of mobiles for detecting the positions of mobiles running in a prescribed range of the course, a determiner for determining the distance between the mobiles in the prescribed range, and a transmitter for detecting that the determined distance between the mobiles is smaller than a prescribed value and selectively transmitting a signal for a warning to the second mobile following the first mobile. The second mobile can perform a prescribed operation for keeping a proper distance between the same and the first mobile in response to the signal for a warning. Preferably, the system further includes a device for changing the prescribed value compared with the determined distance between the mobiles in the transmitter. Proper run management can be made in response to the speeds of the mobiles by changing the prescribed value.

18 Claims, 15 Drawing Sheets

SYSTEM FOR MANAGING SAFE MOBILE RUN BY SCANNING LANE

BACKGROUND OF THE INVENTION

1. Field of the Invention

The present invention relates to a system for keeping safe runs of mobiles, and more particularly, it relates to a mobile run management system for attaining safe runs of mobiles by scanning a lane and keeping a safe distance between the mobiles such as automobiles on an expressway, a reserved road or the like. Throughout the specification and claims, the term "mobiles" indicate not only apparatuses such as automobiles, ships and airplanes for carrying human beings or cargos, but self-movable things such as human beings and other living things.

2. Description of the Background Art

One of the causes for traffic accidents on an expressway, a reserved road or the like is that no safe distance is kept between the vehicles. In order to keep safe runs of automobiles, a safe distance or no distance may be kept between the automobiles.

In order to keep a safe distance between automobiles, it is necessary to provide the vehicles with measuring means which can measure the distance therebetween in high accuracy and high reliability. Considering that the measuring means are provided on respective vehicles, such measuring means must be supplied at a low cost.

As the simplest method of keeping no distance between automobiles, on the other hand, the automobiles 300 and 302 may be coupled with each other by a coupler 304, as shown in FIG. 21. The number of the coupled automobiles is not restricted to two, as a matter of course. When such automobiles are coupled with each other, however, it is difficult for the plurality of coupled automobiles to draw the same trajectory since the road for the automobiles has no means corresponding to the rails on a railroad track.

There has been proposed a method of controlling tracking in a non-contact manner not by such mechanical coupling but by an electronic/communication technique. In this system, a transmitter is provided on a front part of an automobile 312 for detecting a radio or ultrasonic wave transmitted therefrom and reflected by a rear part of another automobile 310 running ahead thereby making non-contact tracking control. In such a non-contact tracking control method, however, measurement errors or errors following data processing exceeding an allowable range may result in an accident. At the moment, therefore, this system is impractical due to insufficient reliability.

After all, the most effective countermeasure against occurrence of an accident is to keep a safe distance between mobiles at present. Thus, development of a highly reliable mobile run management system is awaited. Such a run management system preferably can properly manage runs of mobiles in response to changes of various conditions such as the weather, the average speeds of the mobiles and the like. Further, the system is preferably free from regulation by the radio law or the like since the system is applied to an extremely long road or the like, while the mobiles can preferably utilize information related to runs thereof as much as possible. In addition, the mobiles, which may run at high speeds, can preferably receive information related to the positions and speeds thereof and whether or not the mobiles are present in a certain zone, to sufficiently follow the high speeds. Further, a system which can safely manage not only the distance between the mobiles on a certain lane but course changes by the mobiles on a plurality of lanes.

SUMMARY OF THE INVENTION

Accordingly, an object of the present invention is to provide a highly reliable mobile run management system for safening runs of a plurality of mobiles along a moving course.

Another object of the present invention is to provide a highly reliable mobile run management system which can take an optimum countermeasure for safening runs of a plurality of mobiles along a moving course in response to changes of various conditions.

Still another object of the present invention is to provide a highly reliable mobile run management system employing no radio wave for safening runs of a plurality of mobiles along a moving course.

An additional object of the present invention is to provide a highly reliable mobile run management system for allowing safe control of runs of mobiles by supplying the mobiles with information related to as many moving courses as possible.

A further additional object of the present invention is to provide a highly reliable mobile run management system for safening runs of mobiles by frequently obtaining information related to the positions of the mobiles.

A further object of the present invention is to provide a highly reliable mobile run management system for safening runs of mobiles by transmitting information related to safe runs to the mobiles without employing radio waves.

An additional object of the present invention is to provide a highly reliable mobile run management system for safening runs of mobiles by reliably obtaining information related to the positions of the mobiles.

A further additional object of the present invention is to provide a highly reliable mobile run management system for safening runs of mobiles by reliably obtaining information related to the positions of the individual mobiles and distinguishing the mobiles from each other.

A further object of the present invention is to provide a highly reliable mobile run management system employing an optical system for safening runs of a plurality of mobiles along a moving course.

An additional object of the present invention is to provide a highly reliable mobile run management system employing an optical system for safening runs of a plurality of mobiles along a plurality of moving courses.

A further additional object of the present invention is to provide a highly reliable mobile run management system employing an optical system for safening course-to-course movement of a plurality of mobiles along a plurality of moving courses.

A further object of the present invention is to provide a highly reliable mobile run management system for safening movement of a mobile moving on one of a plurality of moving courses and making course-to-course movement by informing the driver of dangerousness of the course-to-course movement.

A further object of the present invention is to provide a highly reliable mobile run management system safening movement of a mobile moving on one of a plurality of moving courses and making course-to-course movement by making it difficult for the driver to perform a dangerous operation.

An additional object of the present invention is to provide a highly reliable mobile run management system for safening movement of a mobile moving on one of a plurality of moving courses and making course-to-course movement by allowing proper processing in response to the positional relation between the mobile and another mobile.

A further additional object of the present invention is to provide a highly reliable mobile run management system for safening movement of a mobile moving on one of a plurality of moving courses and making a course-to-course movement by allowing optimum processing in response to the positional relation between the mobile and another mobile and other various conditions.

A further object of the present invention is to provide a highly reliable mobile run management system for safely managing runs of mobiles within a prescribed range in high reliability by inhibiting entrance of mobiles in excess of a prescribed number.

The mobile run management system according to the present invention comprises a detector provided along a course for movement of mobiles for detecting the positions of mobiles running in a prescribed range of the course, a determiner for determining the distance between the mobiles in the prescribed range on the basis of an output of the detector, and a transmitter for detecting that the determined distance between the mobiles is smaller than a prescribed value and selectively transmitting a signal for a warning to the second mobile following the first mobile.

Thus, the second mobile can perform a prescribed operation for keeping a proper distance between the same and the first mobile in response to the signal for a warning. The runs can be managed only with respect to the mobiles present in the prescribed range, and the devices necessary therefor may be simple. Thus, runs of a plurality of mobiles along the moving course can be safely managed in high reliability.

Preferably, the mobile run management system according to the present invention further includes a device for changing the prescribed value compared with the determined distance between the mobiles in the transmitter in response to the output of the detector. When the mobiles are at high speeds, for example, the distance therebetween must be increased. Thus, proper run management can be made in response to the speeds of the mobiles by changing the prescribed value.

More preferably, the detector of the mobile run management system includes a light emitter provided above the course for emitting a light beam for scanning the course along a prescribed direction, and a reflected light detector provided in relation to the light emitter for detecting the light emitted from the light emitter and reflected by the mobiles thereby detecting the positions of the mobiles. The light emitter emits the light beam so that the reflected light detector detects the light reflected by the mobiles, whereby the positions of the mobiles can be detected and no radio wave may be employed for obtaining necessary information. Thus, the system is free from regulation by the radio law, and can safely manage runs of a plurality of mobiles along the moving course in high reliability.

The light beam emitted from the light emitter may forwardly scan the course with respect to the direction of movement of the mobiles.

When the light beam forwardly scans the course with respect to the direction of movement at regular intervals, the mobiles can detect the light beam in relatively longer times than those in a contrary case. When the light beam carries information for managing runs of the mobiles, therefore, the mobiles can be supplied with a larger quantity of information to be capable of safely controlling the runs through the information.

Alternatively, the light beam emitted from the light emitter may scan the course reversely with respect to the direction of movement of the mobiles.

When the scanning direction of the light beam is thus reversed, the reflected light detector can first detect the light reflected by the frontmost parts of the mobiles. Thus, the information related to the positions of the mobiles can be obtained faster and the processing therefor can be quickly made as compared with the case of scanning the course in the opposite direction, whereby the runs of the mobiles can be managed in high reliability.

According to another aspect of the present invention, the transmitter of the mobile run management system includes a modulator for modulating the light beam emitted from the light emitter with a prescribed signal.

In order to provide the mobiles with information, the light beam employed for detecting the positions of the mobiles can carry the information. Thus, it is possible to supply the mobiles with information related to safe runs thereof in a simple structure without employing a radio wave.

According to still another aspect of the present invention, the mobiles are provided with retroreflectors, and the reflected light detector of the mobile run management system includes a device for detecting reflected light from the retroreflectors.

The light beam emitted from the light emitter reversely advances along the path of the emitted light beam when reflected by the retroreflectors. The positions of the mobiles can be reliably detected by detecting the reflected light reversely advancing along the path of the light beam.

According to a further aspect of the present invention, the detector of the mobile run management system includes an image camera provided above the course for picking up an image of the prescribed range of the course, and an image processor for detecting the positions of the mobiles on the basis of the image of the prescribed range of the course in response to an output of the image camera.

Thus, the positions of the mobiles on the course can be detected on the basis of further total information by making processing on the basis of the image of the prescribed range of the course, thereby more safely managing runs of the mobiles.

A mobile run management system according to an additional aspect of the present invention includes a detector provided along a course for movement of mobiles for detecting the positions and speeds of mobiles running in a prescribed range of the course, a determiner for determining whether or not a second mobile is present in a predetermined range around a certain mobile in the prescribed range on the basis of an output of the detector, and a transmitter for selectively transmitting a signal for a warning to the second mobile in response to a determination on the presence of the second mobile in the predetermined range. Thus, the second mobile can perform a prescribed operation for keeping a proper distance between the same and the certain mobile in response to the signal for a warning.

A mobile run management system according to a further aspect of the present invention includes a detector, a table, and an optical scanner. The detector is provided along at least two adjacent courses among a plurality of courses for mobiles for detecting the position and the speed of a mobile running in a prescribed range of at least one of the at least two courses. The table determines a value of a signal as a function of the distance from the mobile whose position is detected on the basis of an output of the detector. The optical scanner scans the boundary portion between the adjacent two courses with a light beam modulated with the signal outputted from the table in response to this signal.

After the position of the mobile is detected, the value of the signal is determined as the function of the distance from the position of the mobile, so that the light beam is modulated with the signal to scan the boundary portion between the two courses. A second mobile running on the second one of the courses, entering the boundary portion and detecting the light beam can receive information related to the position of the mobile running on the first course from this light beam. Therefore, the second mobile running on the second course can perform an operation for properly controlling the direction of its movement in response to the signal carried by the light beam. Thus, it is possible to provide a highly reliable mobile run management system employing an optical system for safening runs of a plurality of mobiles along a plurality of moving courses.

The mobile run management system may further include a device provided on each mobile for performing a predetermined operation for properly controlling the direction of its movement in response to the signal carried by the light beam.

The mobile performs the predetermined operation for properly controlling the direction of its movement in response to the signal carried by the light beam, whereby runs of the mobiles can be more safely managed.

The mobile run management system may generate a warning against an operation of a driver for changing the direction of movement of his mobile across the boundary portion between two courses. If the driver recognizes no presence of the mobile running on the adjacent course, he can return the direction of the movement in response to the warning, thereby reducing the possibility of collision. Thus, the course-to-course movement can be more safened.

The mobile run management system may control operations of steering systems so that a load of a certain value is applied to a steering operation of a driver for changing the lanes of his mobile across the boundary portion and a smaller load is applied to a steering operation for oppositely changing the direction of movement respectively.

A large load is applied to the course change toward the course presenting another mobile while a small load is applied to an opposite course change, whereby the possibility of a course change leading to collision with another mobile is reduced as a result. Thus, it is difficult for the driver to perform a dangerous operation, whereby movement of the mobiles can be more safened.

According to a further aspect of the present invention, a mobile run management system includes a confirm device provided along a course for movement of a mobile for confirming whether or not a mobile running in a prescribed range of the course is present, and an optical scanner for generating a signal indicating whether or not the prescribed range is blocked in response to an output of the confirm device for scanning the prescribed range with a light beam modulated with the signal. Thus, a mobile intending to enter the prescribed range can recognize whether or not this range is blocked. If the prescribed range is blocked, it is possible to control the mobile not to enter the prescribed range. Thus, the mobiles can be readily inhibited from entering the prescribed range in excess of a prescribed number. In this case, the system is free from regulation by the radio law. Consequently, it is possible to provide a mobile run management system which can safely manage runs of mobiles in the prescribed range in high reliability by inhibiting the mobiles from entering the prescribed range in excess of the prescribed number.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

The basic idea of a first embodiment of the present invention is now described. While the present invention is hereafter described with reference to a device for attaining safe runs of automobiles on a road, the present invention is applicable to safe movement of not only automobiles but self-movable apparatuses such as airplanes and ships as well as living things such as human beings.

In order to more safen runs of automobiles on a one-lane road, certain intervals must be kept between precedent and subsequent vehicles. The intervals conceivably include a time interval and a space interval. These intervals must be changed in response to the speeds of the automobiles.

As a system for keeping certain intervals between precedent and subsequent vehicles, an agreement is made to allow entrance of only one automobile in a determined section. This is referred to as a "blocking" system, similarly to "blocking" on a railroad. In order to implement such blocking, entrance of an automobile may be allowed in a certain section presenting no automobile while allowing no entrance or transmitting warning information indicating inhibition of entrance if an automobile is already present in the section. However, it is impractical to bury a loop in the course for automobiles, dissimilarly to the railroad. A mobile run management system similar to such "blocking system" for keeping a safe distance between automobiles on an expressway or a reserved road is now described.

Figure 1:
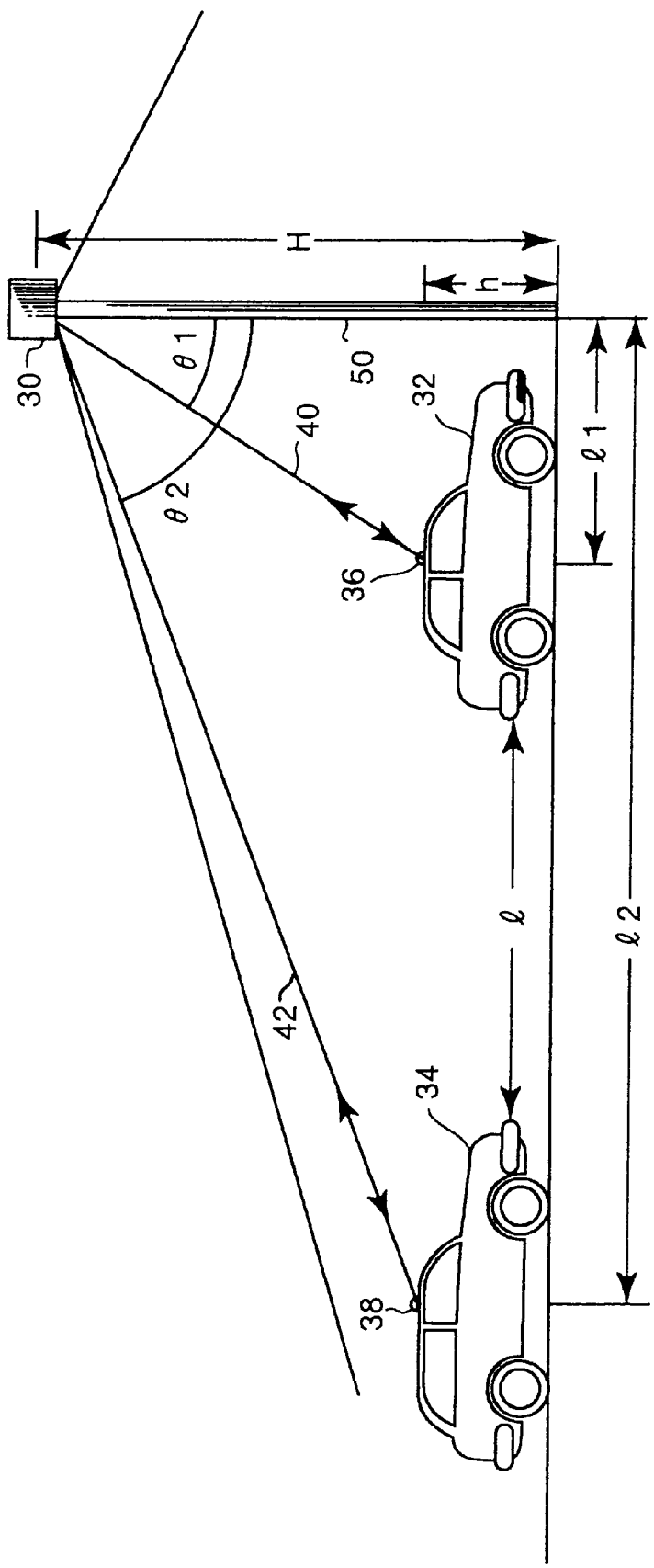
FIG. 1 is a front elevational view showing a system according to a first embodiment of the present invention.
Figure 2:
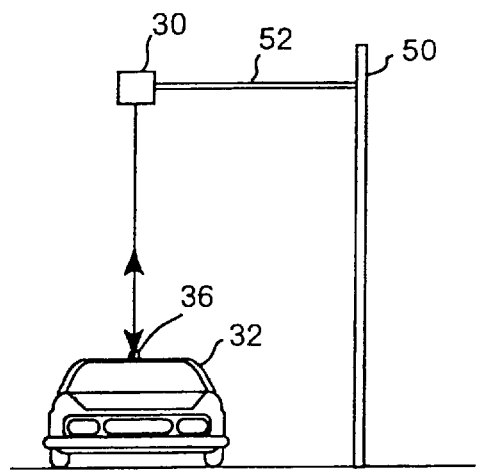
FIG. 2 is a right side elevational view of the system shown in FIG. 1.
Figure 3:
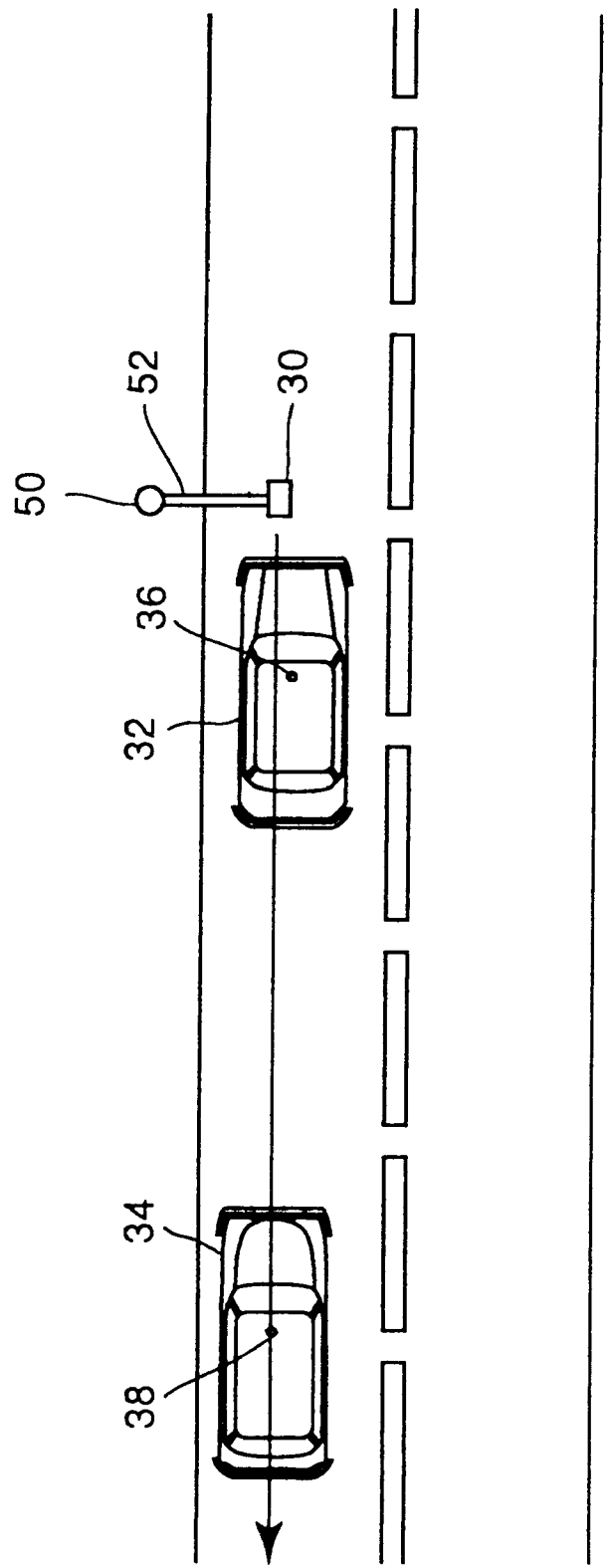
FIG. 3 is a top plan view of the system shown in FIG. 1.

Referring to FIGS. 1 to 3, a run management device 30 is provided on a high portion along a road serving as a course for automobiles, which are exemplary mobiles. The run management device 30 is arranged on a position above the center of a lane by a pole 50 provided on a side of the road, for example, and an arm extending toward the center of the road from a forward end of the pole 50. As shown in FIGS. 1 to 3, the run management device 30 scans a certain range around its position with a light beam. In this embodiment, it is assumed that the road is a two-lane road. While the light beam scans a certain range of the road in this embodiment, another medium such as a radio or ultrasonic wave can alternatively be employed so far as the same has high directivity.

Automobiles 32 and 34 running on the road are provided on the roofs thereof with retroreflectors (e.g., the so-called corner cubes or corner reflectors) 36 and 38 for reflecting incident light in the direction of incidence. The following description is made on the assumption that the retroreflectors 36 and 38 are corner cubes. While the retroreflectors 36 and 38 are preferably prepared from corner cubes which can implement a desired function in a simple structure, the same may alternatively be prepared from photoreceptors capable of determining the direction of incidence of light and laser beams capable of controlling a light emitting direction, for example.

A light beam 40 incident upon the corner cube 36 of the automobile 32 from the run management device 30 is reflected by the corner cube 36, and returns to the run management device 30 along the same course. Another light beam 42 incident upon the corner cube 38 of the automobile 34 from the run management device 30 returns to the run management device 30 along the same course. Therefore, the distances between the pole 50 and the automobiles 32 and 34 can be recognized through the following expressions (1) and (2) by detecting the reflected light entering the run management device 30 along the same courses as the light beams 40 and 42 and recognizing the angles Θ1 and 22 of emission of the light beams 40 and 42:

$$R1 = (H-h)\tan 21 \quad (1)$$

$$R2 = (H-h)\tan 22 \quad (2)$$

$$R = R2 - R1 \quad (3)$$

where H represents the height of the run management device 30 from the road surface, and h represents the heights of the corner cubes 36 and 38 from the road surface.

The distance between the automobiles 32 and 34 (more correctly, the distance between the corner cubes 36 and 38) is obtained by obtaining the difference between the two positions in accordance with the expression (3), whereby the distance between the two automobiles 32 and 34 can be recognized in consideration of the lengths thereof. The structure of the run management device 30 is described later.

Figure 4:
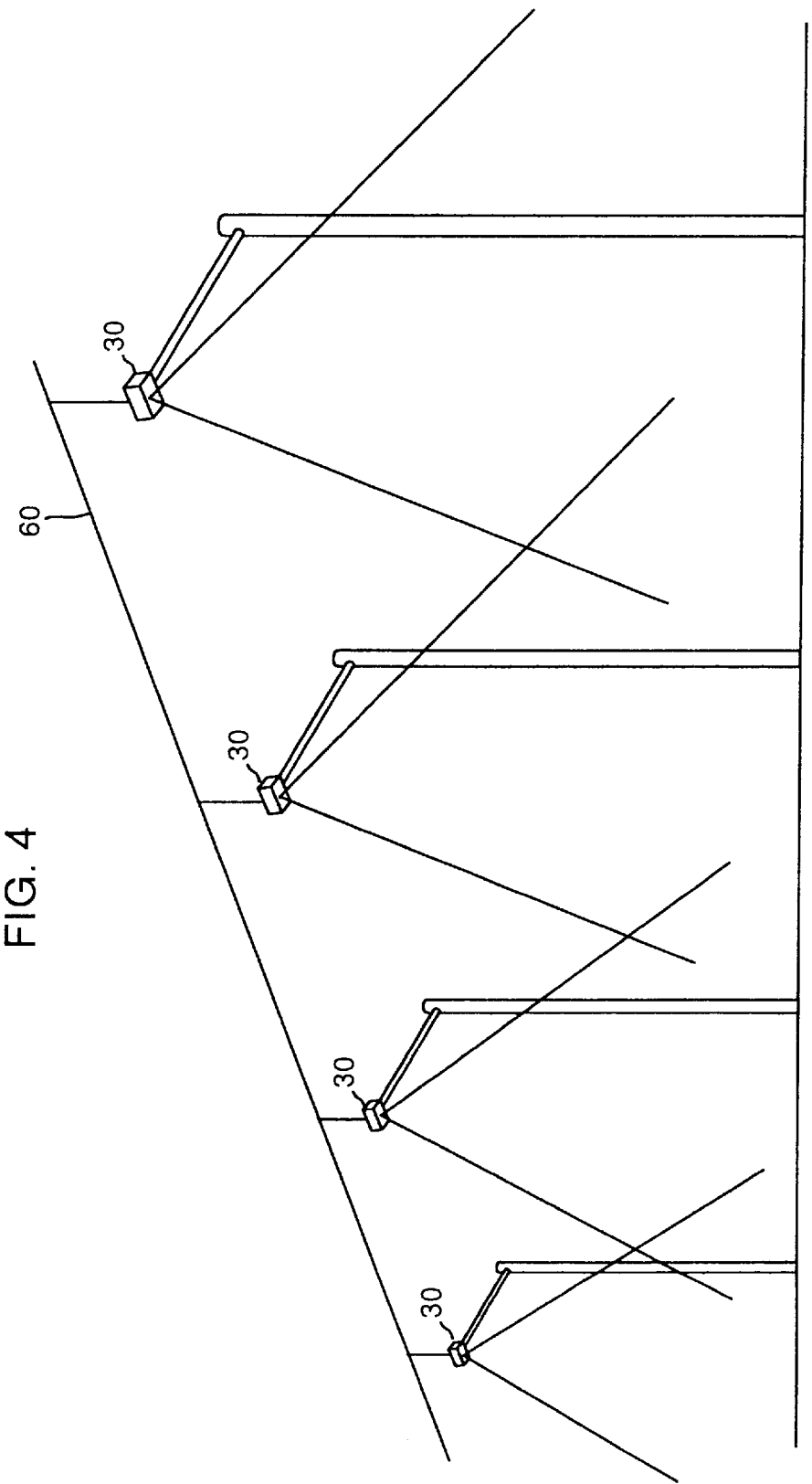
FIG. 4 illustrates the arrangement of the system shown in FIG. 1.

Referring to FIG. 4, a plurality of run management devices 40 are arranged side by side on the side of the road, for managing runs of automobiles in prescribed ranges related thereto respectively. Preferably, a communication line 60 connects the plurality of run management devices 30 with each other, thereby allowing information exchange between the run management devices 30, distribution of traffic information or the like, etc.

Figure 5:
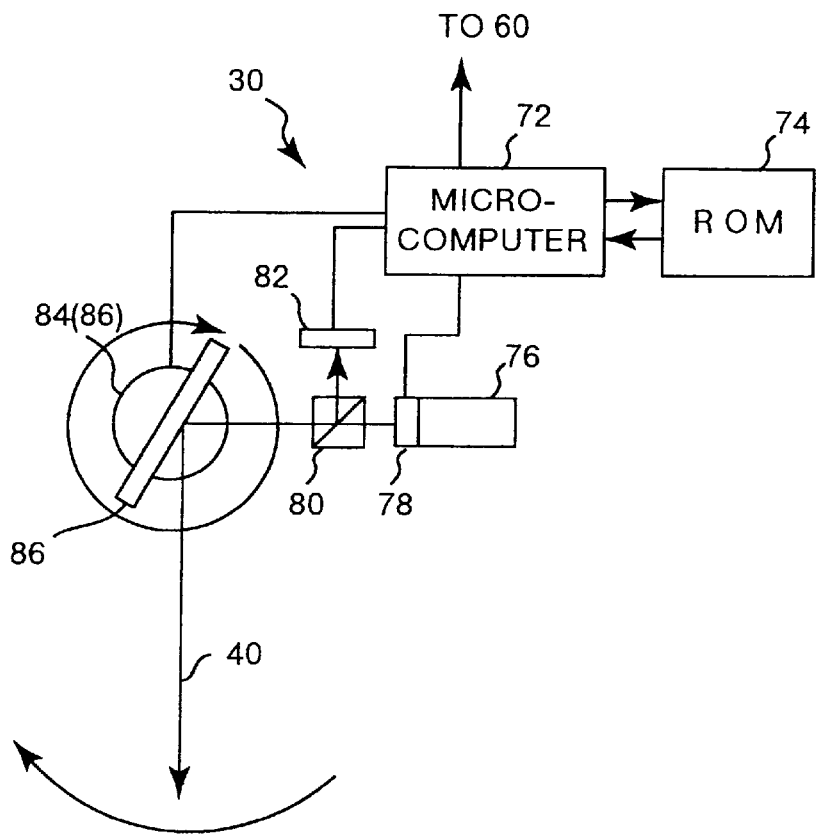
FIG. 5 is a block diagram showing the structure of a run management device according to the first embodiment of the present invention.
Figure 6:
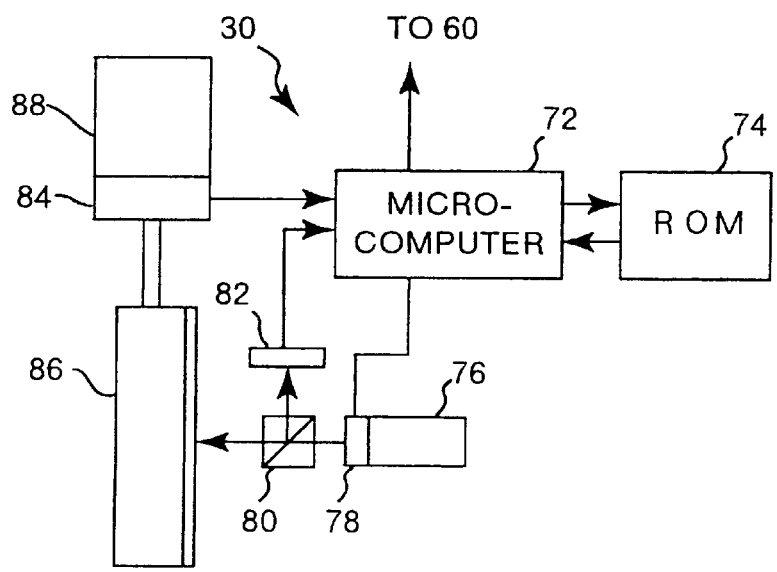
FIG. 6 is a block diagram showing the structure of the run management device according to the first embodiment of the present invention.

Referring to FIGS. 5 and 6, the run management device 30 includes a light beam generator 76, a liquid crystal shutter 78 for modulating a light beam emitted from the light beam generator 76 with an externally supplied signal, a rotatable reflector 86 for reflecting the light beam generated from the light beam generator 76 and modulated by the liquid crystal shutter 78, a motor 88 for rotating the reflector 86, an encoder 84 for detecting the angle of rotation of the reflector 86 and outputting an angle signal, a beam splitter 80 provided in an optical path between the liquid crystal shutter 78 and the reflector 86 for orthogonally branching light reflected by the corner cubes provided on the automobiles and further reflected by the reflector 86 to oppositely advance along the path of the light beam, a photoelectric sensor 82 for detecting the light branched by the beam splitter 80 and converting its intensity to an electric signal, a microcomputer 72 for obtaining the distance between the mobiles in a range related thereto on the basis of outputs from the encoder 84 and the photoelectric sensor 82, generating a signal to be supplied to the subsequent automobile and supplying the signal to the liquid crystal shutter 78, and a ROM (read-only memory) 74 for previously storing the relations of the above expressions (1) and (2) in the form of a table so that information is retrieved from the table by the microcomputer 72. The microcomputer 72 is also connected with the communication line 60, as shown in FIG. 4. In place of the microcomputer 72, a logic circuit employing a programmable logic array or the like may alternatively be employed.

When recognizing that the light beam is reflected by the corner cubes through the output of the photoelectric sensor 82, the microcomputer 72 obtains the angle of emission of the light beam through the current output of the encoder 84 and retrieves information from the table of the ROM 74 thereby obtaining the current distances between the run management device 30 and the automobiles. When the distance between the automobiles is determined to be smaller than a predetermined value, the microcomputer 72 generates a signal for instructing the subsequent automobile to reduce its speed and supplies the liquid crystal shutter 78 with this signal at a prescribed timing thereby supplying the information to the subsequent automobile, as described later. The automobile receiving this signal performs a predetermined operation for avoiding a danger by automatically applying the brake or warning the driver to reduce the speed, thereby properly increasing the distance between the same and the precedent automobile. Thus, it is possible to attain an effect identical to blockade of a prescribed range around the precedent automobile.

As shown in FIG. 5, the reflector 86 is rotated in a prescribed direction, whereby the light beam 40 generated from the light beam generator 76 is rotated to scan the road in a constant direction along the direction of reflection of the reflector 86. The direction of this rotation may be forward or reverse with respect to the direction of the automobiles. If the rotation is forward, the time interval for introducing the light beam 40 into the running automobiles is increased, whereby the light beam 40 can carry a larger quantity of information for supplying the same to the automobiles. If the light beam 40 scans the road reversely to the direction of the automobiles, on the other hand, the positions of the automobiles can be more quickly detected when the corner cubes are provided on front parts of the automobiles, for example, so that proper processing for safety control can be more quickly performed. This also applies to automobiles provided with no corner cubes.

Figure 7:
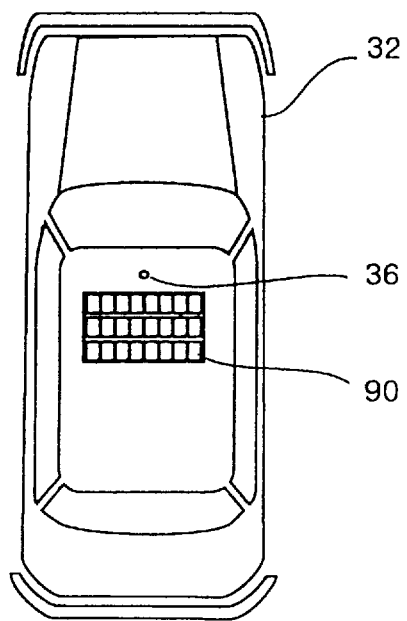
FIG. 7 illustrates the arrangement of a corner cube and a photosensor on an automobile suitable to this system.

FIG. 7 shows the roof of the automobile 32. As shown in FIG. 7, the corner cube 36 is provided on a front part of the roof of the automobile 32, and a photoelectric sensor 90 is provided at the back thereof. The information from the run management device 30 can be obtained by receiving the light beam by the photoelectric sensor 90 and decoding the received signal. In response to the result, the automobile 32 can automatically reduce its speed or generate a warning for instructing the driver to reduce the speed, for example.

While the light beam for detecting the positions of the automobiles itself carries the modulated signal based on the information as to the angle of scanning in this embodiment, the modulated signal may alternatively be carried by a radio or ultrasonic wave having high directivity, so that the automobiles are provided with equipment for receiving the signal. Further, information on changes of the speeds and courses of the automobiles, which can be readily recognized from the time changes of the positions thereof, may also be utilized for the control.

Figure 8:
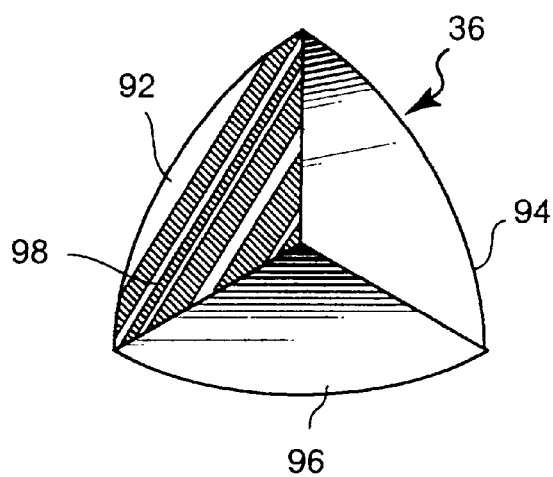
FIG. 8 typically illustrates an exemplary corner cube having a function of modulating incident light with specific information.

The corner cube 36 preferably has a function of modulating the light beam with information specific to the automobile provided therewith, so that the run management device 30 can identify each automobile on the basis of the specific information for more reliably confirming the position of the automobile and calculating its speed. FIG. 8 shows exemplary means for making such modulation. The corner cube 36 shown in FIG. 8 is prepared by combining three total reflecting surfaces 92, 94 and 96 to be orthogonal to each other, as well known in the art. A bar code 98 indicating specific information is previously printed on the surface 92. When the light beam scans this corner cube 36, the incident light is modulated by the bar code 98 and reflected in the direction of incidence since black portions of the bar code 98 reflect no light. The corner cube 36 may be prepared from a prism or a reflector.

Figure 9:
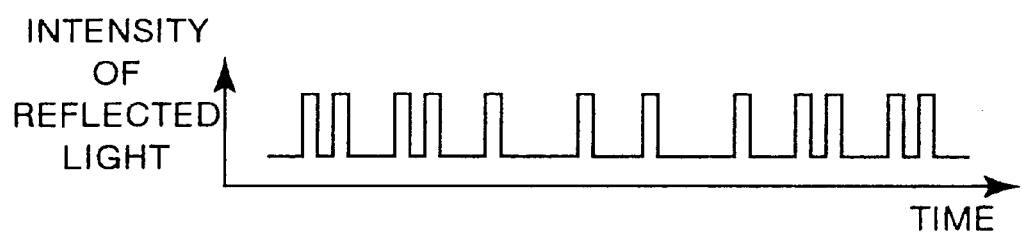
FIG. 9 is a graph showing time changes of the intensity of reflected light modulated by the corner cube shown in FIG. 8.

FIG. 9 illustrates an exemplary relation between the intensity of the light reflected and modulated by the corner cube 36 shown in FIG. 8 and the time. In general, the light beam scanning the corner cube 36 is first incident upon the reflecting surface 92 and reflected toward another surface, or first reflected by another surface and thereafter incident upon the reflecting surface 92, depending on the position of incidence. The position of incidence is varied with the scanning by the light beam, and hence the intensity of the reflected light is horizontally symmetrical about the center of the time axis, as shown in FIG. 9. The specific information provided to each automobile can be obtained by decoding the intensity of the reflected light as a digital signal.

Figure 10:
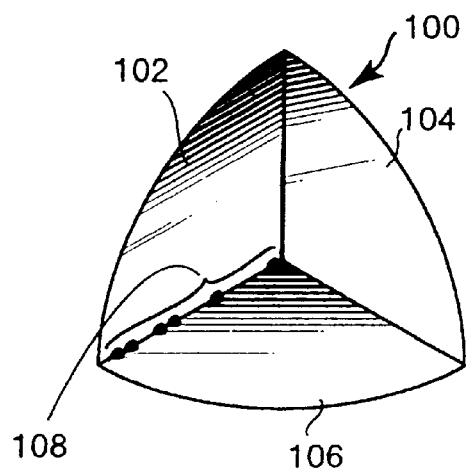
FIG. 10 typically illustrates another exemplary corner cube having a function of modulating incident light with specific information.
Figure 11:
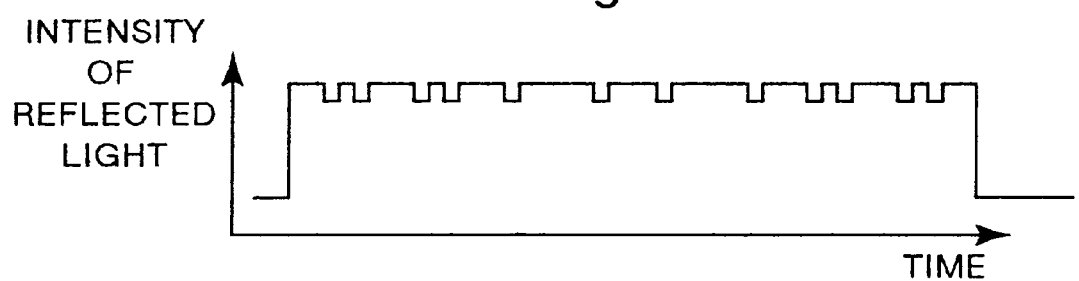
FIG. 11 is a graph showing time changes of the intensity of reflected light modulated by the corner cube shown in FIG. 10.

FIG. 10 shows another exemplary corner cube 100. This corner cube 100 has three reflecting surfaces 102, 104 and 106, while some dots 108 are printed on a boundary portion between the reflecting surfaces 102 and 106. The dots 108 are black, to reflect no light. When this corner cube 100 is scanned with a surface beam, therefore, the intensity of the reflected light is slightly reduced in case of scanning the dots 108 as compared with that in case of scanning the remaining portions. Thus, a relation shown in FIG. 11 appears between the intensity of the reflected light and the time. The specific information provided to each automobile can be recognized by decoding the change of the intensity of the reflected light shown in FIG. 11.

Figure 12:
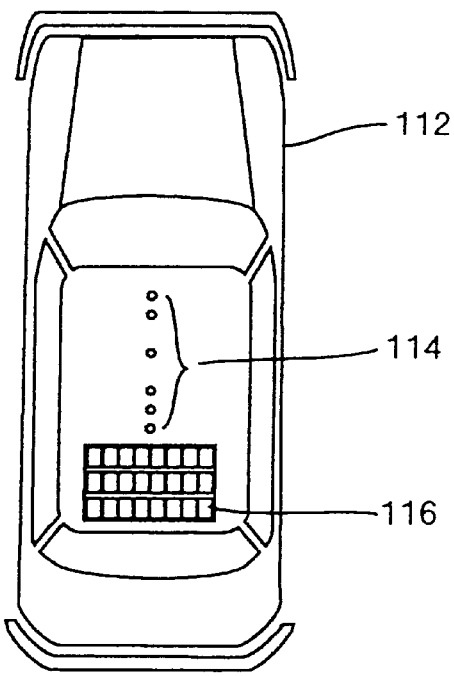
FIG. 12 illustrates exemplary arrangement of corner cubes on an automobile in case of modulating reflected light by a plurality of corner cubes.

The corner cube shown in each of FIGS. 8 and 10 itself has the function of modulating the specific information. Alternatively, a plurality of corner cubes 116 may be provided on the roof of an automobile 112 for providing specific information of the automobile 112 through the positions of the corner cubes 114, as shown in FIG. 12. While a photosensor 116 is provided at the back of the corner cubes 114 as shown in FIG. 12, the positions of the corner cubes 114 and the photosensor 116 are not restricted to those shown in FIG. 12, as a matter of course.

The reflector 86 shown in FIG. 5 and 6 is adapted to make the light beam scan the road along a straight line, and cannot make scanning along a curve. If the light beam must scan the road along a curve, the reflector may have a structure shown in FIG. 13.

Figure 13:
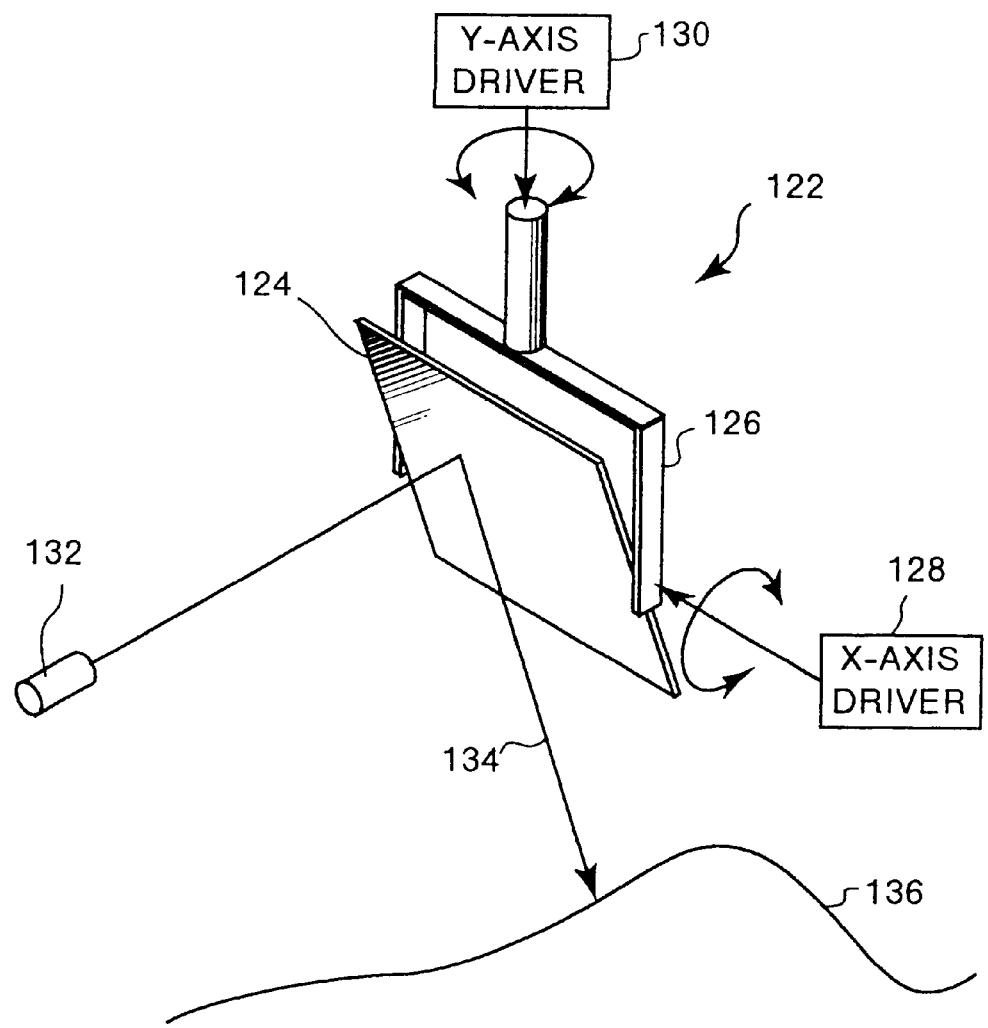
FIG. 13 typically illustrates a device which can make scanning with a light beam along an arbitrary curve.

Referring to FIG. 13, a light beam reflector 122 includes a reflector 124, a frame 126 for holding the reflector 124 to be rotatable about an X- or Y-axis, an X-axis driver 128 for rotating the frame 126 about the X-axis, and a Y-axis driver 130 for rotating the frame 126 about the Y-axis. When the X- or Y-axis driver 128 or 130 is driven to adjust the angle of the reflector 124 about the X- or Y axis, a beam from a light beam generator 132 provided on a prescribed position for emitting the light beam toward a prescribed direction is reflected by the reflector 124, to draw a curve 136 in response to a change of the position of the reflector 124. Namely, it is possible to make the light beam scan a road not only along a straight line but a general curve by employing the light beam reflector 122.

Figure 14:
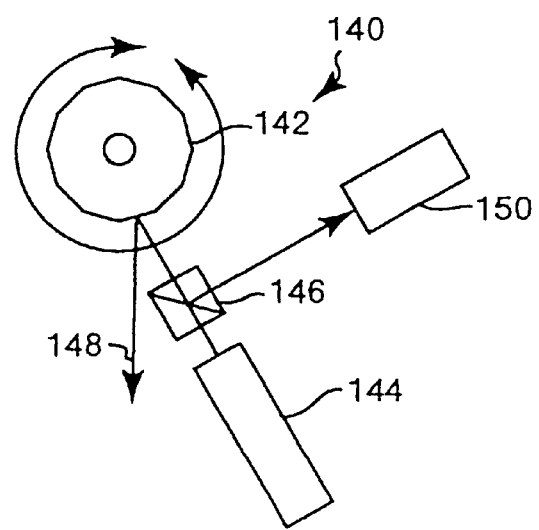
FIG. 14 is a block diagram showing the structure of a light beam reflector employing a polygon mirror.

Each of the reflectors shown in FIGS. 5 and 6 and FIG. 13 has two reflecting surfaces. Alternatively, a light beam reflector utilizing a polygon mirror may be employed, as shown in FIG. 14. Referring to FIG. 14, a light beam reflector 140 includes a polygon mirror 142 and a motor (not shown) for rotating the polygon mirror 142 about its axis. A light beam generator 144 is arranged to be opposed to a peripheral surface of the polygon mirror 142 at a prescribed angle, so that a light beam 148 emitted therefrom is successively reflected by the peripheral surface of the rotated polygon mirror 142 to implement scanning with desired light.

Also in the case shown in FIG. 14, the position of each automobile can be detected by providing a beam splitter 146 for branching light reflected from the corner cube provided on the automobile and a photoelectric sensor 150 for converting the branched light to an electric signal.

When a polygon mirror is employed in the aforementioned manner, the number of scanning times is increased regardless of the rotation frequency of the mirror so that the positional information of each automobile can be obtained in a short cycle, whereby the speed of the automobile can be readily obtained by the positional information of each automobile in a unit time.

When the speed of any automobile which can be obtained in the aforementioned manner is remarkably different from a prescribed value such as a speed limit, a relative speed with respect to the remaining automobiles, for example, a signal for warning the automobile to reduce is speed or for making automatic speed reduction may be generated to the automobile.

The aforementioned idea of the first embodiment is also applicable in case of utilizing only one side of a two-lane road due to construction work. In this case, authorization for automatically inducing/guiding automobiles through optical means is successively supplied to automobiles which are allowed to run, and successively recovered from that completely running through the section. Unauthorized automobiles are inhibited from entering the section. A similar idea resides in a tablet in a single-track section of a railroad. The feature of this embodiment resides in that not a physical tablet but a tablet serving as information is employed for authorizing traffic. This embodiment can be regarded as utilizing a "virtual tablet".

Embodiment 2

Figure 15:
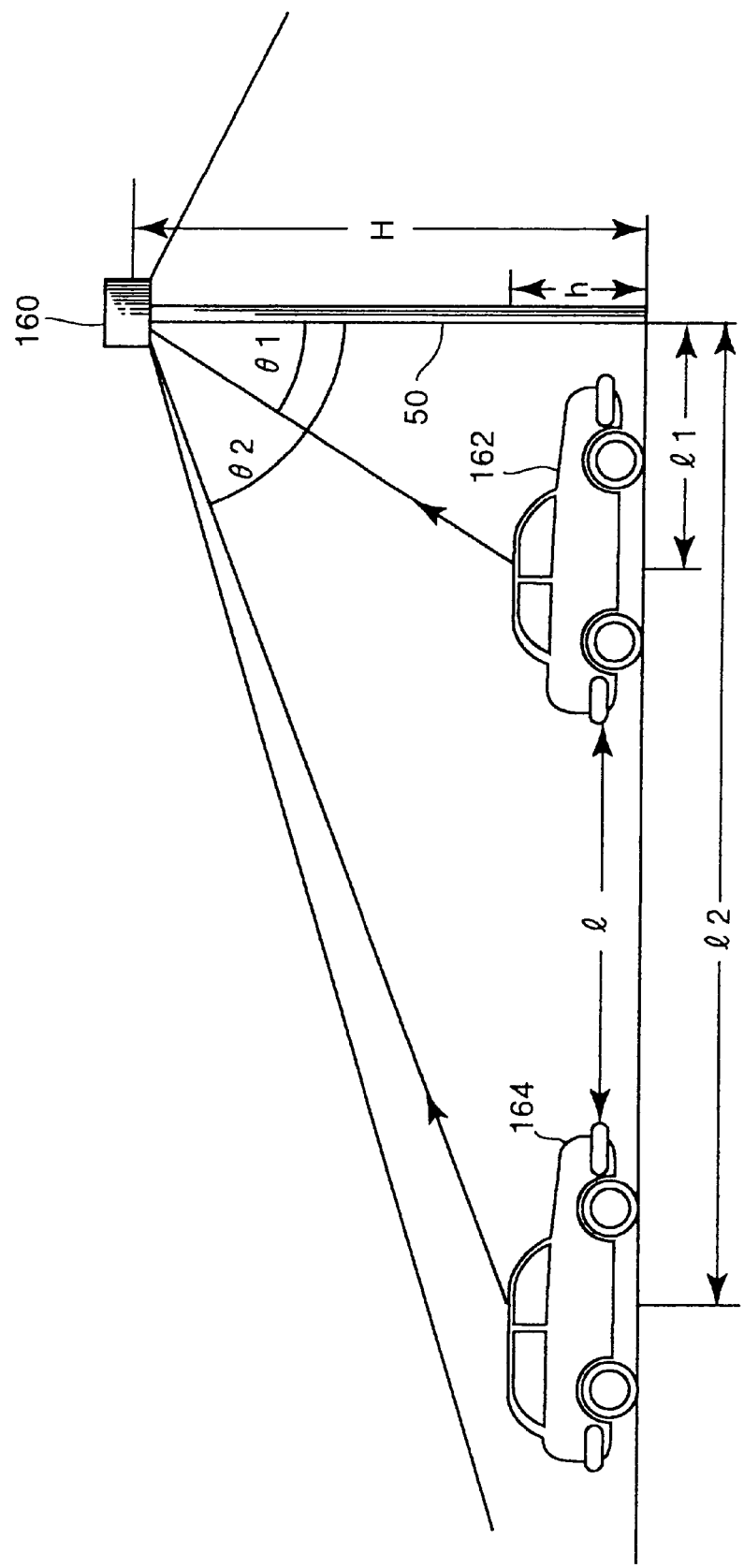
FIG. 15 is a side elevational view of a system according to a second embodiment of the present invention.

A mobile run management system according to a second embodiment of the present invention is now described with reference to FIGS. 15 to 17. Referring to FIG. 15 corresponding to FIG. 1 for the first embodiment, the second embodiment is different from the first embodiment in a point that the system utilizes a run management device 160 comprising an image camera and having a function of acquiring images of a lane and processing the images thereby detecting positions and speeds of automobiles, in place of the run management device 30 having the function of emitting a light beam. As shown in FIG. 15, therefore, the run management device 160 merely picks up images of automobiles 162 and 164 with the camera, and the automobiles 162 and 164 are provided with no corner cubes. However, it is assumed that photosensors similar to the photosensors 90 and 116 shown in FIGS. 7 and 12 are arranged on the roofs of the automobiles 162 and 164, as described later.

Figure 16:
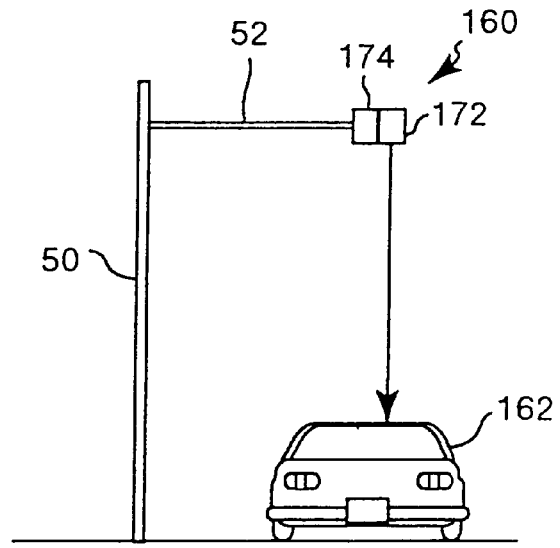
FIG. 16 is a front elevational view of the system shown in FIG. 15.

As shown in FIG. 16, this run management device 160 is arranged above a central part of the lane by a pole 50 and an arm 52, similarly to the run management device 160 according to the first embodiment. This run management device 160 includes an image pickup system 174 for acquiring images of the lane, and a light beam generating device 172 for processing the picked-up images thereby detecting the positions and speeds of the automobiles and supplying a signal for automatic control or a warning to the second automobile following the first automobile on the basis of the detected positions and speeds of the automobiles.

Figure 17:
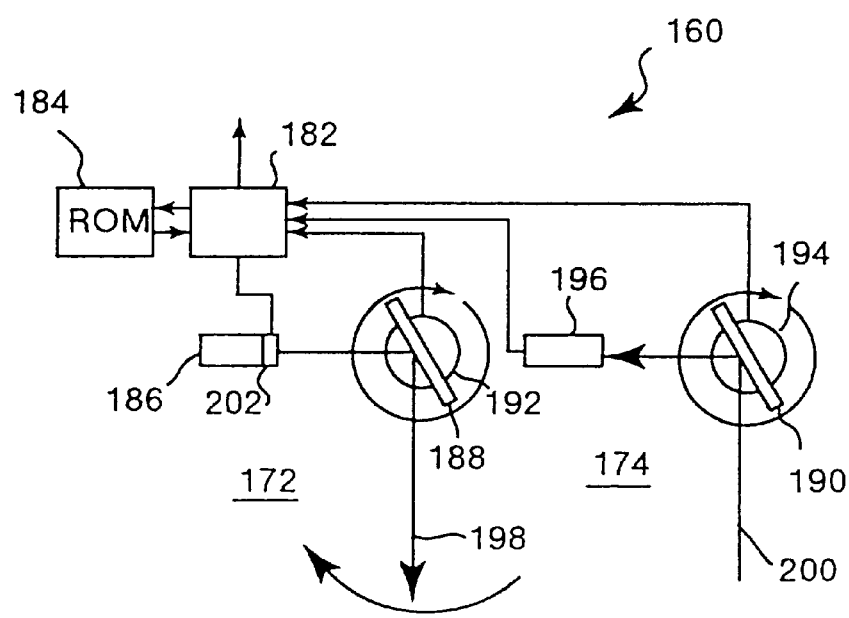
FIG. 17 is a block diagram showing the structure of a run management device according to the second embodiment of the present invention.

FIG. 17 shows the run management device 160 in further detail. Referring to FIG. 17, the run management device 160 includes the image pickup system 174 and the light beam generating device 172, as well as a microcomputer 182 for calculating the positions and speeds of the automobiles on the basis of outputs of the image pickup system 174 and performing processing for determining whether or not a warning must be issued to any automobile in a region related thereto, and a ROM 184 storing a table utilized by the microcomputer 182 for calculating the positions of the mobiles. In the device according to the second embodiment, the distances between the same and the automobiles can be recognized from depression angles 21 and 22 with respect to the automobiles 162 and 164, the height H of the run management device 160 and the heights h of the photosensors by the functions expressed in the expressions (1) and (2), and the distance between the automobiles 162 and 164 can be recognized by obtaining the difference between the distances between the device and the automobiles 162 and 164, as shown in FIG. 15. The ROM 184 previously stores the angle 21 etc. and plane distances between the automobiles 162 and 164 and the run management device 160 in the form of a table. The storage unit for storing this table is not restricted to the ROM 184, but a RAM, or preferably an non-volatile RAM, may alternatively be employed.

As shown in FIG. 17, the image pickup system 174 includes a reflector 190, a motor 194 for rotating the reflector 190, a sensor 196 for detecting the intensity of incident light 200 reflected by the reflector 190 and outputting a picture signal, and an encoder (not shown) for detecting the angle of rotation of the reflector 190 and supplying a signal thereof to the microcomputer 182.

The light beam generating device 172 includes a light beam generator 186, a reflector 188, a motor 192 for rotating the reflector 188, a liquid crystal shutter 202 for modulating a light beam emitted from the light beam generator 186 with a signal supplied from the microcomputer 182, and an encoder (not shown) for detecting the angle of rotation of the reflector 188 and supplying a signal thereof to the microcomputer 182.

In the light beam generating device 172, the reflector 188 is rotated so that the light beam 198 is rotated to scan a prescribed range. When an output of the encoder reaches a certain value, the microcomputer 182 supplies a signal indicating prescribed information to the liquid crystal shutter 202 thereby modulating the light beam 198 with this signal, so that information can be supplied to automobiles.

Similarly in the image pickup system 174, the reflector 190 is rotated to scan the course so that its images can be successively introduced into the sensor 196 and converted to picture signals. The current angle of the reflector 190 is recognized by the output of the encoder, so that the microcomputer 182 can obtain the positions and speeds of the automobiles in the course through the information.

In the system according to the second embodiment, the positions and speeds of the automobiles are detected by image processing, dissimilarly to the first embodiment. In the remaining points, the processing performed in the second embodiment is identical to that in the first embodiment. Therefore, redundant description is omitted.

Embodiment 3

Figure 18:
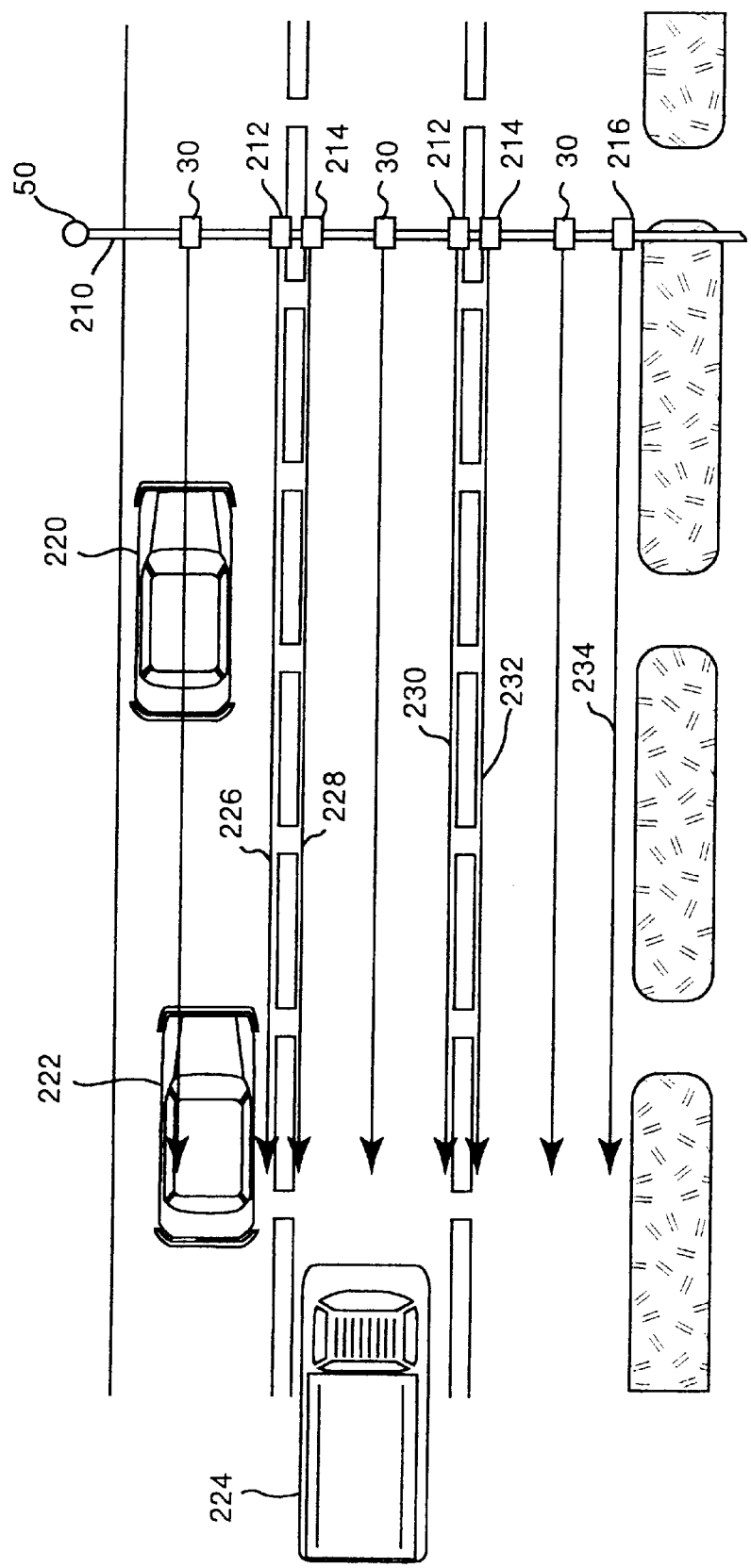
FIG. 18 is a plan view showing the arrangement of a run management device and an optical scanner according to a third embodiment of the present invention.

A system according to a third embodiment of the present invention can be utilized for control for regulating overtaking or intrusion of automobiles running on a road having a plurality of lanes, or join control in a plurality of lanes having no-passing zones and including an unusable lane. FIG. 18 is a plan view showing the concept of the third embodiment.

Referring to FIG. 18, it is assumed that a road to which this system is applied is a six-lane road. The number of the lanes is not restricted to six, but the present invention is also applicable to a four-lane road or a road having eight or more lanes, as a matter of course. FIG. 18 shows only lanes in one direction.

Similarly to the systems according to the first and second embodiments, a pole 50 is provided on a side of the road, and a beam 210 is provided on its upper end to extend across the road. Three run management devices 30 are arranged on this beam 210, to be positioned above the centers of the respective lanes. The run management devices 30 are similar to that described with reference to the first embodiment. As characteristic parts of this embodiment, the system has optical scanners 212 provided on the left side of a boundary portion between the left and central lanes and the central side of a boundary portion between the central and right lanes for scanning these portions with light beams 226 and 230 respectively thereby forming "light walls", in a manner of speaking, and optical scanners 214 provided on the central side of the boundary portion between the left and central lanes and the right side of the boundary portion between the central and right lanes for scanning the portions with light beams 228 and 232 respectively thereby forming "light walls", in a manner of speaking. Signals for modulating these optical scanners 212 and 214 are described later.

As shown in FIG. 18, an optical scanner 216 for similarly forming a light wall with a light beam 234 is provided on the road divider side of the right lane. This light beam 234 is modulated with information for inhibiting automobiles from further rightward movement. Therefore, any automobile running on the right lane and approaching the road divider is automatically steer-controlled in a direction for separating from the road divider through a signal of the above information. Alternatively, a warning is issued to warn the automobile to change the course leftward.

The light beams, modulated with information, generated from the optical scanners 212 and 214 are now described. As shown in FIG. 18, it is assumed that two automobiles 220 and 222 run on the left lane and an automobile 224 runs on the central lane.

As already described, the distance between the automobiles 220 and 222 can be properly managed by processing of the left run management devices 30. It is assumed that corner cubes and photosensors are arranged on the roofs of the automobiles 220, 222 and 224, although these elements are not shown in FIGS. 18 and 19.

Consider that the automobile 222 changes its course from the left lane to the central lane. In this case, the positional relation between the automobile 222 and the automobile 224 running on the central lane comes into question. If the automobile 224 is immediately on the right side of the automobile 222, for example, the automobile 222 must not change its course. Even if the automobile 224 is behind the automobile 222, it may be desirable that the automobile 222 makes no course change until a sufficiently safe distance is ensured if the distance between the automobiles 222 and 224 is short. This system makes management related to such a course change in the following manner:

Referring to FIG. 18, it is assumed that only the left and central lanes are taken into consideration. The optical scanner 212 provided on the left lane operates in accordance with information from the run management device 30 provided on the central lane, while the optical scanner 214 provided on the central lane operates in accordance with information from the run management device 30 provided on the left lane.

For example, the run management device 30 provided on the central lane can recognize the position and speed of the automobile 224, as already described. When supplied with this information, the optical scanner 212 modulates the light beam 226 with a signal inhibiting the course change from the left lane to the right lane or indicating that this course change must be made with sufficient care as to a prescribed range in front of the automobile 224. As to a portion ahead of this range, the optical scanner 212 modulates no light beam, or modulates the light beam 226 with information allowing a course change. Namely, it is conceivable that the signal for modulating the light beam 226 is monotonously changed frontward from the automobile 224.

If the automobile 222 running on the left lane moves rightward to change its course, the light beam 226 will be incident upon the photosensor provided on its roof. If the position of the automobile 222 is within the prescribed range in front of the automobile 224, the light beam 226 received by the automobile 222 must have been modulated with the signal inhibiting the course change or indicating that the course change must be made with care. Therefore, the automobile 222 can obtain proper information as to whether or not the course must be changed by decoding the light beam 226 and interpreting its information. In accordance with the information, the course of the automobile 222 can be controlled to automatically return to the left lane or an alarm can be given to warn the driver to return to the left lane.

The optical scanner 214 provided on the central lane similarly operates in accordance with information from the run management device 30 on the left lane. Therefore, if the automobile 224 intends to enter the left lane while overtaking the automobile 222, for example, the light beam 228 will supply the automobile 224 with a signal inhibiting such intrusion. Anyway, it comes to that an automobile running on any lane and intending to change its course is supplied with information inhibiting the course change or informing the driver of dangerousness from the optical scanner of any run management device in response to the distance between the automobile and the run management device.

Figure 19:
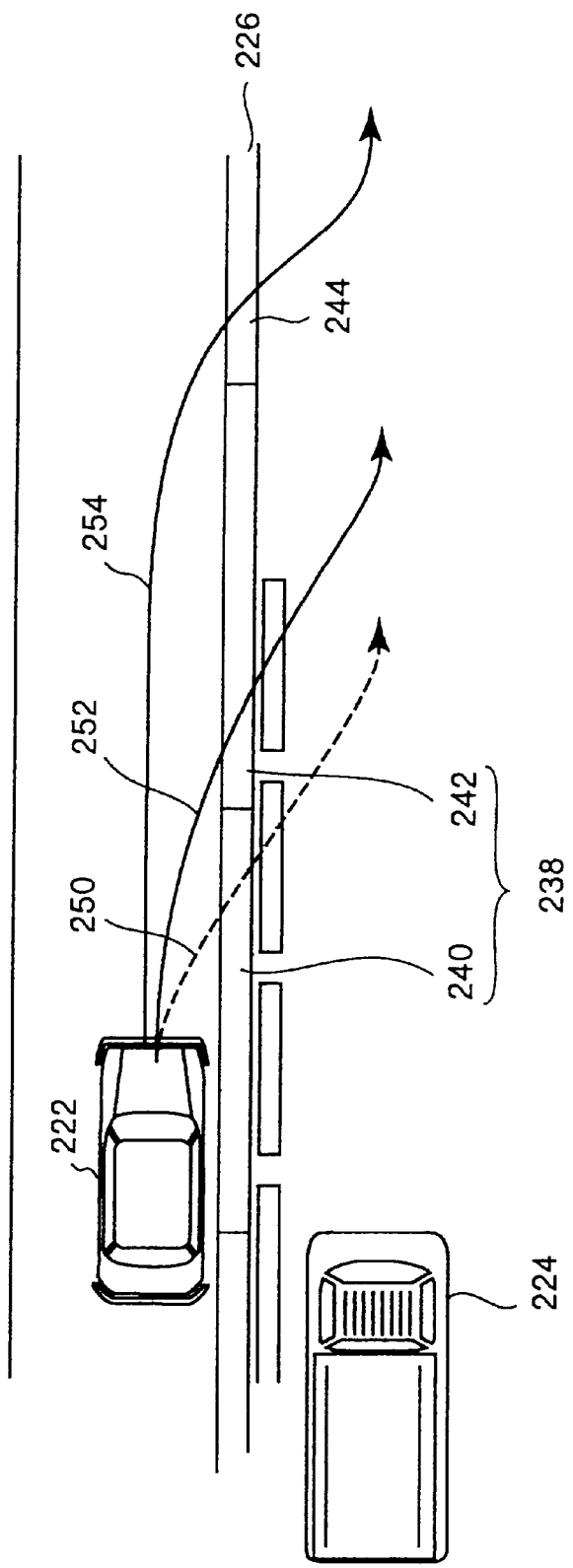
FIG. 19 is a plan view typically showing division of a zone into subzones according to the third embodiment of the present invention.

FIG. 19 shows division of information of a modulated signal in case of modulating light with the optical scanner 212 provided on the left lane of FIG. 18, for example. Referring to FIG. 19, a zone 238 of a certain distance starting from the automobile 224 is previously set as a zone for inhibiting any course change or causing a dangerous course change. In a portion ahead of this zone, the light beam 226 is not modulated at all or modulated with a signal allowing a course change.

The zone 238 is divided into a subzone 240 for inhibiting any course change of the automobile 222 and another subzone 242 inhibiting no course change but indicating necessity of care. It is assumed that these subzones 240 and 242 are modulated with signals whose values are monotonously (or stepwisely) changed as the distances from the automobile 224 are increased.

Consider that the automobile 222 intends to change its course along arrow 250 in FIG. 19. In this case, the automobile 222 will enter the subzone 240. In this case, the signal carried by the light beam 226 is at a value indicating inhibition of the course change. If the automobile 222 runs by automatic steering, therefore, no course change is made along the arrow 250 but the automobile 222 will return to the left lane.

Consider that the automobile 222 changes its course along arrow 252. In this case, the automobile 222 will enter the subzone 242. In this portion, the signal carried by the light beam 226 takes a value indicating that no course change is inhibited but sufficient care must be taken. In this case, there are various ideas as to how to control the automobile 222.

Consider that the automobile 222 runs by complete automatic steering, for example. If the relative speed of the automobile 222 with respect to the automobile 224 is larger than a prescribed speed, it may be possible to program the automatic steering system of the automobile 222 to allow a course change to the central lane in this subzone 242 while allowing no course change in other case.

If the automobile 222 is driven by a driver, on the other hand, only a warning may be issued without controlling the steering itself. If the automobile 222 is steered with auxiliary power in the so-called power steering mode, the steering device may be so controlled that high power is necessary for a steering operation for changing the course rightward while the steering can be made in an opposite direction with relatively small power. If the driver insists on changing the course to the central lane, he will change the course even if such high power is necessary. Otherwise the driver will not dare to change the course with high power, and the course will be so controlled that the automobile 222 remains running on the left lane as a result. Thus, various processing operations are conceivable in response to the situations, when the automobile 222 changes its course through the subzone 242.

When the automobile 222 changes its course along arrow 254, this course change results in no problem since the light beam 226 is not modulated or modulated with a signal allowing the course change in the zone 244.

Figure 20:
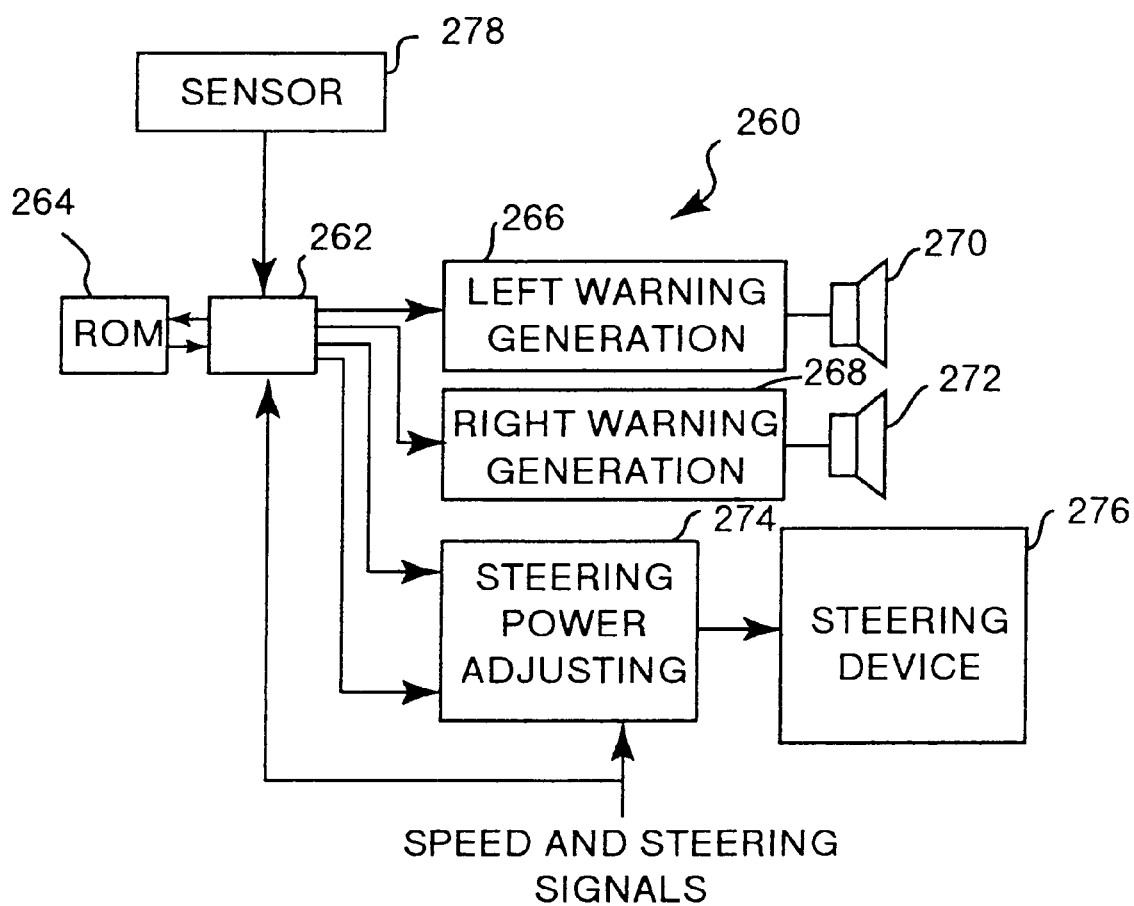
FIG. 20 is a block diagram showing a run management device provided on an automobile, which is suitable to the third embodiment of the present invention.
Figure 21:
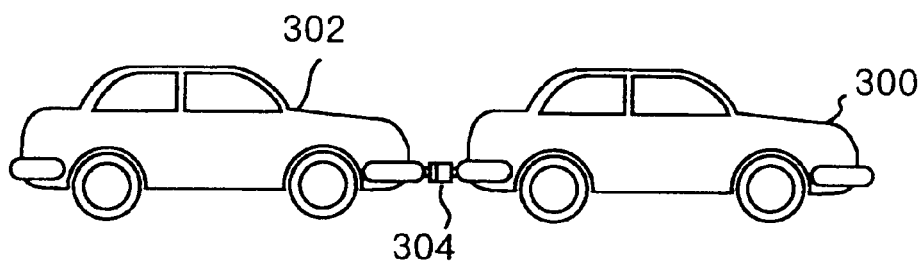
FIG. 21 illustrates an exemplary conventional system.
Figure 22:
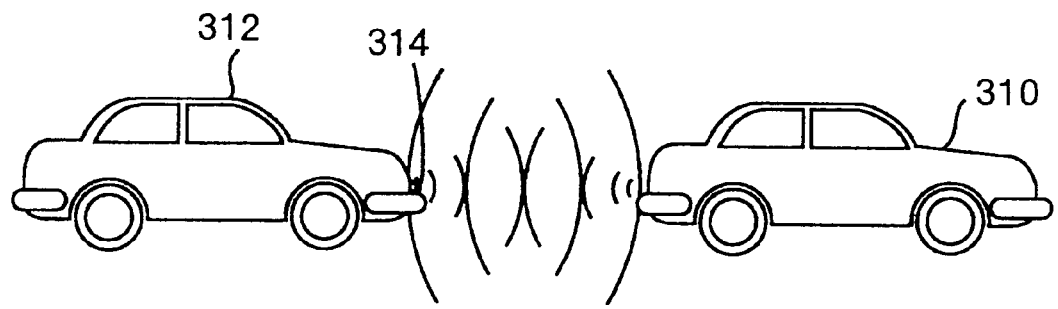
FIG. 22 is a model diagram showing another exemplary conventional system.

FIG. 20 shows a run management device 260 provided on each automobile, which is suitable to the third embodiment. A sensor 278 shown in FIG. 20, which is similar to the photosensor 90 or 116 shown in FIG. 7 or 12, is adapted to detect the light beam from optical scanner 212, 214 or 216 of any run management device 30 shown in FIG. 18 and convert the same to an electric signal.

Referring to FIG. 20, the run management device 260 includes a microcomputer 262 for performing processing for generating a warning signal in response to an output of the sensor 278 and controlling a steering device 276 such as a power steering device provided on the automobile in the aforementioned manner, a ROM 264 previously storing dta necessary for the processing of the microcomputer 262, a left warning generation circuit 266 for driving a speaker 270 for issuing a left warning in response to a signal drawing attention as to a leftward course change generated from the microcomputer 262, a right warning generation circuit Θ2 for driving another speaker 272 for issuing a right warning in response to a signal informing the automobile of dangerousness as to a rightward course change, and a steering power adjusting circuit 274 for controlling the steering device 276 and performing the aforementioned control of the steering power in response to a signal indicating to which one of leftward steering power and rightward steering power a larger load is applied, a signal indicating the value of the load to be applied, and speed and steering signals from various sensors provided on the automobile. The speakers 270 and 272 are provided on the left and right sides with respect to the driver's seat respectively, so that presence of a danger on the left or right side is recognized through the warning generated from the speaker 270 or 272. The warning is not restricted to a sound warning, but a light or vibration warning may alternatively be issued.

The microcomputer 262 performs the processing already described with reference to FIGS. 18 and 19, whereby the processing for safely changing the course of the automobile or inhibiting the course change in a dangerous case can be performed.

It will be obvious for those skilled in the art that the aforementioned system is also applicable to join control in such case that the number of a plurality of lanes is reduced. In particular, runs of automobiles which are controlled by automatic steering can be controlled by alternately generating block signals in certain zones of two lanes, for example, regardless of the positions running thereon by providing the aforementioned system for joining. Considerably long zones are preferably set as the certain zones for avoiding collision while preventing reduction of the speeds in joining. The zones are divided into some subzones as already described for controlling the distance between the automobiles and the speeds thereof every subzone, whereby a number of automobiles can be made to run without reducing average speeds and to safely join with each other. In joining of a large number of lanes, the so-called "multiplexer control" can be made by repetitively performing processing of successively joining vehicles of the respective lanes with each other.

In each of the aforementioned embodiments, the distance between automobiles present in a certain range is measured for generating a signal for controlling the distance between the automobiles or a course change in response to the distance. However, the idea of the present invention is not restricted to such case. When the position of a certain moving vehicle is detected, for example, a determination may be made as to whether or not another mobile is present within a prescribed range around the position for performing the already described processing in response to the result of this decision. On the other hand, the lengths of the zone and the subzones shown in FIG. 19, for example, are not necessarily fixed. It may be desirable to increase the length of the zone if the automobiles run at high speeds, and it may also be desirable to similarly increase the length of the zone in case of rain, for example. It is obvious that the values set as the length of the zone and a proper distance between automobiles can be varied with the weather, the density of running automobiles and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile run management system including:
   a detector being provided along a course for movement of mobiles for detecting the positions of mobiles running in a prescribed range of said course;
   determination means for determining the distance between said mobiles in said prescribed range on the basis of an output of said detector; and
   light transmission means for detecting that determined said distance between said mobiles is smaller than a prescribed value and selectively transmitting a light signal for a warning to a second said mobile following first said mobile to maintain a prescribed distance between said mobiles, the light signal being implemented for selectively instructing passive loading of a steering system of the first mobile or the second mobile;
   wherein said detector includes:
      light emitting means being provided above said course for emitting a light beam for scanning said course in a prescribed direction, and
      reflected light detection means being provided in relation to said light emitting means for detecting light being emitted from said light emitting means and reflected by said mobiles thereby detecting the positions of said mobiles.

2. The mobile run management system in accordance with claim 1, further including means for changing said prescribed value in response to said output of said detector.

3. The mobile run management system in accordance with claim 2, wherein said prescribed direction is forward with respect to the direction of movement of said mobiles.

4. The mobile run management system in accordance with claim 2, wherein said prescribed direction is reverse with respect to the direction of movement of said mobiles.

5. The mobile run management system in accordance with claim 2, wherein said transmission means includes modulation means for modulating said light beam being emitted from said light emitting means with a prescribed signal.

6. The mobile run management system in accordance with claim 2, wherein said light emitting means includes:
- a polygon mirror,
- means for rotating said polygon mirror about its axis, and
- means being provided to be opposed to a peripheral surface to said polygon mirror at a prescribed angle for emitting said light beam toward said polygon mirror to be reflected by said peripheral surface to rotated said polygon mirror.

7. The mobile run management system in accordance with claim 2, wherein each said mobile is provided with a retroreflector, and
- said reflected light detection means includes means for detecting reflected light from said retroreflector oppositely advancing along the path of said light beam being emitted from said light emitting means.

8. The mobile run management system in accordance with claim 7, wherein said retroreflector has a function of modulating incident light with specific information.

9. The mobile run management system in accordance with claim 2, wherein said detector includes:
- an image camera being provided above said course for picking up an image of said prescribed range of said course, and
- an image processor for detecting the positions of said mobiles on the basis of said image of said prescribed range of said course in response to an output of said image camera.

10. A mobile run management system including:
- a detector being provided along a course for movement of mobiles for detecting the positions of mobiles running in a prescribed range of said course;
- determination means for determining whether or not a second mobile is present in a predetermined range around a certain mobile in said prescribed range; and
- light transmission means for selectively transmitting a light signal for a warning to said second mobile in response to a determination on the presence of said second mobile in said predetermined range, the light signal being implemented for selectively instructing passive loading of a steering system of the first mobile or the second mobile;
- wherein said detector includes:
  - light emitting means being provided above said course for emitting a light beam for scanning said course in a prescribed direction, and
  - reflected light detection means being provided in relation to said light emitting means for detecting light being emitted from said light emitting means and reflected by said mobiles thereby detecting the positions of said mobiles.

11. A mobile run management system including:
- a detector being provided along at least two adjacent courses among a plurality of courses for allowing mobiles to move thereon in a prescribed direction while making said mobiles movable therebetween for detecting the position of a mobile running in a prescribed range of at least a first one of said at least two courses;
- a table for determining a value of a signal as a function of the distance from said mobile whose position is detected on the basis of an output from said detector; and
- optical scanning means for rotating/scanning a light beam being modulated with said signal along a boundary portion between said two adjacent courses in response to said signal,
- thereby enabling a second mobile running on second said course to perform an operation for properly controlling the direction of its movement in response to said signal being carried by said light beam when entering said boundary portion.

12. The mobile run management system in accordance with claim 11, further including means being provided on each said mobile for performing a predetermined operation for properly controlling the direction of its movement in response to said signal being carried by said light beam.

13. The mobile run management system in accordance with claim 12, wherein said predetermined operation includes an operation for issuing a warning against a driver's operation for changing the direction of movement of any said mobile across said boundary portion.

14. The mobile run management system in accordance with claim 12, wherein said predetermined operation includes an operation for controlling an operation of a steering system so that a load of a certain value is applied to a driver's steering operation for changing the direction of movement of any said mobile across said boundary portion while a smaller load is applied to a steering operation for a change in an opposite direction respectively.

15. The mobile run management system in accordance with claim 12, wherein said value of said signal as said function of said distance from said mobile whose position is detected is set to take a value monotonously changed toward a direction increasing said distance from said mobile whose position is detected, and
- said predetermined operation is an operation making a course change difficult in response to said signal when detected said distance from said mobile is small.

16. The mobile run management system in accordance with claim 15, wherein said function is set to be changed following a change of a predetermined condition.

17. A mobile run management system including:
- confirming means being provided along a course for movement of mobiles for confirming whether or not a mobile running in a prescribed range of said course is present; and
- optical scanning means for generating a signal indicating whether or not said prescribed range with a light beam being modulated with said signal, the signal being implemented for selectively instructing passive loading of a steering system of one of the mobiles.

18. A mobile run management system including:
- a detector being provided along a course for movement of mobiles for detecting the positions of mobiles running in a prescribed range of said course;
- determination means for determining the distance between said mobiles in said prescribed range on the basis of an output of said detector; and
- light transmission means for detecting that determined said distance between said mobiles is smaller than a prescribed value and selectively transmitting a light signal for a warning to a second said mobile following first said mobile to maintain a prescribed distance between said mobiles, the light signal being implement for selectively instructing loading of a steering system of the first mobile or the second mobile;
- wherein said detector includes:
  - light emitting means being provided above said course for emitting a light beam for scanning said course in a prescribed direction, and reflected light detection means being provided in relation to said light emitting means for detecting light being emitted from said light emitting means and reflected by said mobiles thereby detecting the position of said mobile, wherein the light signal is implemented to instruct directional loading of the steering system such that a load of a certain value is applied to a driver's steering operation for changing direction of movement of any mobile across said boundary portion while a smaller load is applied to a steering operation for a change in an opposite direction respectively.

* * * * *